July 26, 1932.     B. MARKUS     1,868,837
DRINKING WATER COOLING AND DISPENSING APPARATUS
Filed Jan. 16, 1929
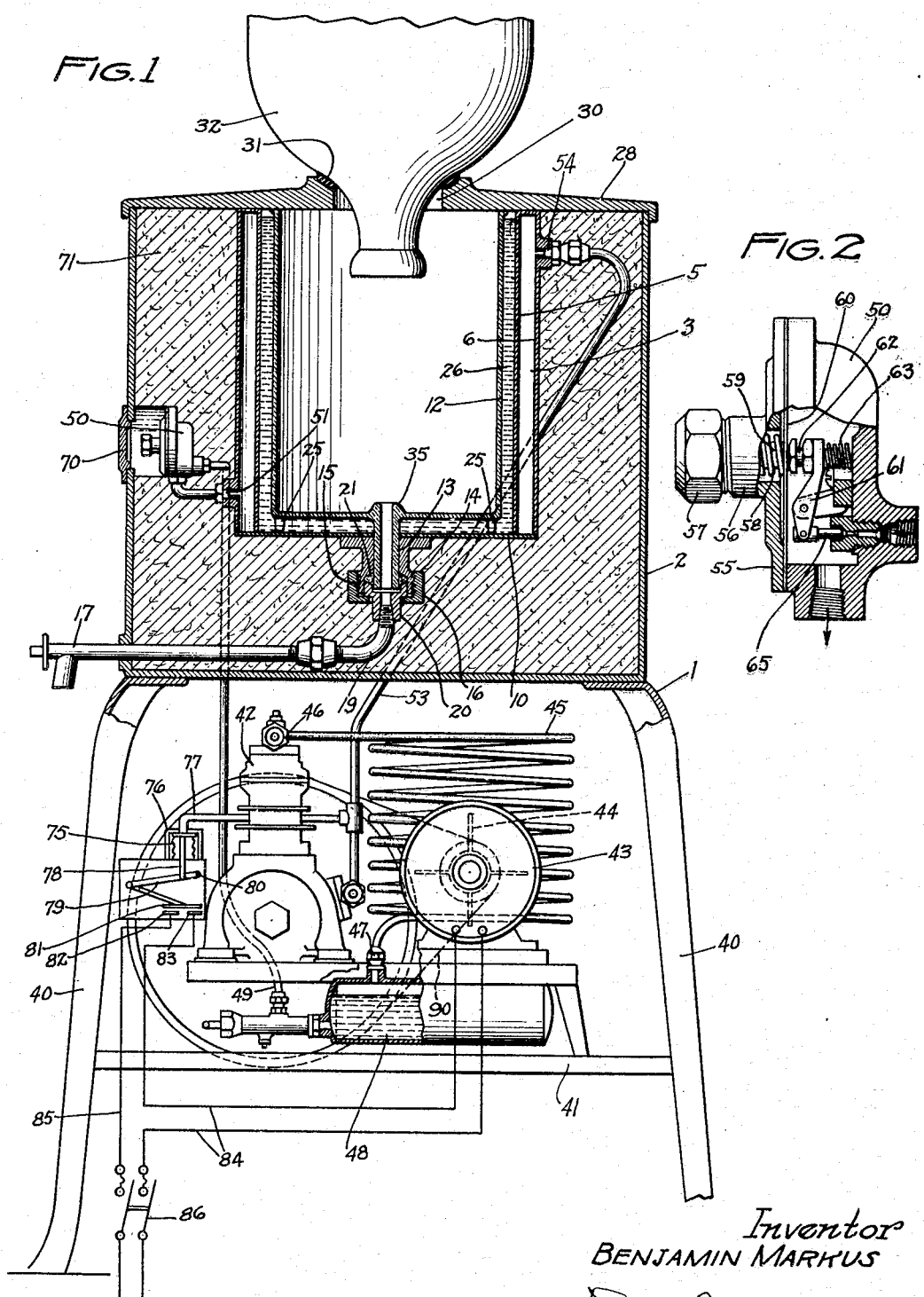
Inventor
BENJAMIN MARKUS
ATTORNEYS Patented July 26, 1932

1,868,837

UNITED STATES PATENT OFFICE

BENJAMIN MARKUS, OF OAK PARK, ILLINOIS, ASSIGNOR TO HENRY P. WATSON, OF MINNEAPOLIS, MINNESOTA

DRINKING WATER COOLING AND DISPENSING APPARATUS

Application filed January 16, 1929. Serial No. 332,966.

This invention relates to improvements in drinking water cooling and dispensing apparatus.

The invention is an improvement on my copending application for analogous subject matter, Serial Number 146,210, filed November 4th, 1926.

Objects of the invention are to eliminate the use of refrigeration coils and thus prevent defrosting and therefore dripping; to provide a receiving vessel or casing from which the water is delivered; to provide means for detachably securing this vessel by means of a liquid outlet extension; to form the vessel so as to provide a trap to prevent the delivery of sediment into the outlet extension; to construct the vessel of a material which will facilitate the detection of sediment; to provide means for obtaining and maintaining control of the temperature of the water contained in the glass vessel; to eliminate the icing operation ordinarily used with devices of the inverted bottle type shown in Patent Number 895,782; to reduce the cost of manufacturing the device and to reduce expense of operating the device; and generally to provide a cheap and efficient device.

Features of the invention also include the details of construction of the apparatus as shown, although there is no intention to be limited only to details.

Other objects, features and certain advantages of the invention will be set forth in the description of the drawing forming a part of this application, and in said drawing Figure 1 is a sectional elevation of the device; and Fig. 2 is a detail sectional view of one form of expansion valve.

A stand 1 is provided with a boxing 2 mounted upon its top. Within the boxing is a casing, or vessel generally designated 3 having inner and outer vertically disposed walls respectively designated 5—6 spaced to form a comparatively narrow circumferentially continuous expansion chamber, which is closed at top and bottom. This double wall in this instance extends the full vertical height of the vessel 3. The bottom wall of vessel 3 is indicated at 10, and is formed by a plate. The vessel 3 is formed by punching to obtain the spaced walls, and then the lower end is closed by the plate 10 suitably attached. The vertical portion only of the vessel is provided with a double wall construction. Within the vessel 3 and spaced from its inner wall 5 is a receptacle 12 of glass. This is a feature of the invention. This receptacle is provided with a liquid outlet extension 13 which passes downwardly through the bottom 10 of the receptacle 3 into a stuffing gland generally indicated 14. The gland is threaded exteriorly as at 15 and has the clamping nut 16. A valve controlled delivery pipe is generally indicated at 17, and has threaded connection with a compression element 20 of the gland, with which the nut 16 is engaged in a manner to cause this element to compress the gasket 21 about the tube 13 to obtain a water tight connection. Removability of the receptacle 12 is thus obtained, and is a feature of the invention. By this means the receptacle can be easily detached by a movement in vertical direction. The receptacle 12 is preferably provided with feet 25 so that its bottom is raised from the bottom 10 of the receptacle 3. The receptacle 3 has therein a suitable conducting liquid such as a mixture of alcohol and water and/or glycerin and water. This mixture is indicated at 26.

The casings 3 and 12 are sealingly closed by a cover 28 having a central opening 30. Arranged around the opening is a gasket 31 through which the neck of the bottle 32 passes, and with which the bottle has a seating engagement. The operation of dispensing is the usual one for this inverted bottle type of device.

Another feature of the invention relates to means for preventing the delivery of sediment through the tube 13 into the delivery line 17. For this purpose, a guard rim 35 is formed at the inner side of the vessel 12 circumscribing the bore of the tube 13. The height of this annular guard is sufficient to prevent the delivery of sediment over the guard and into the bore of the tube 13, during delivery of liquid. The casing 12 is formed from a material which facilitates detection of the sediment. For example, of white glass or porcelain. This is a feature.

Between the supporting legs 40 of the stand is arranged a shelf 41, and upon this shelf is mounted a refrigerating apparatus which may be of any approved type, and constitutes means for producing refrigerating effects in the expansion chamber. This means may include a compressor 42, a motor 43 having connected therewith a fan 44 adapted to cool the condensing coils indicated at 45. The condensing coils have a connection with the compressor 42 as at 46. The lower end of the coil is suitably connected as at 47 with the receiver 48. This receiver is connected by a pipe line 49 with an expansion valve generally indicated at 50. It will be understood that any preferred form of valve may be used. A sectional view of the valve 50 is shown in Figure 2. The delivery end of this valve is connected as at 51 with the outer wall 6 of the casing 3 and is adapted to deliver into the vertically elongated, in this instance cylindrical space between the walls 5 and 6 which space constitutes an expansion chamber. The arrangement is such that an uninterrupted flow of the liquid toward the bottom of the expansion chamber is provided for.

The suction side of the compressor 42 is connected by a pipe 53, with the expansion chamber as at 54. In this instance the connection is made at a point above the level of the expansion valve connection, at the highest level of the chamber, and preferably at the highest level of the water in the vessel 12. The device shown herein is designed for the use of sulphur di-oxide as a refrigerant.

The expansion valve comprises a casing 50 having a cover 55, which cover has a tubular extension 56 in which a compression spring is mounted, the degree of compression of the spring being variable by means of a set screw (not shown), mounted at the outer end of the tubular member and covered by a cap screw 57. The compression spring 58 engages the adjusting screw at one end, and at the opposite end engages a stud 59 carried by a diaphragm 60. The diaphragm is clamped between elements 50—55. Suitably mounted at the opposite side of the diaphragm is a lever 61 having a stud 62 at its upper end, one end of which engages the diaphragm and the opposite end of which projects to form a guide for a coil spring 63 arranged between the lever and the inner wall of the casing 50. This coil spring tends to force the needle valve 65 against its seat, against the action of the compressed liquid. The valve operates in a well known manner. The springs 58—63 are adjusted to obtain an opening of the valve under the desired pressure, so that when this degree of pressure has been reached the valve will automatically open, and when the pressure is sufficiently reduced will automatically close. Access to the expansion valve is had through an opening in the boxing 2 which opening is suitably closed by a cover 70.

The space between the double walled element 6 and the wall of the casing 2 is filled with a suitable heat insulating material generally indicated at 71.

In order to control the temperature of the liquid, to keep the same cold but prevent freezing, an automatically operable controlling means is connected in the low pressure line of the device, said means being operable to control the current to the motor which operates the compressor.

The above mentioned temperature controlling means is diagrammatically represented. Numeral 75 indicates an expansion element disposed within a chamber 76. Communicating with this chamber is a pipe 77, which pipe communicates at its opposite end with a low pressure suction line 53. Connected with the accordion-like diaphragm 75 as by a link 78, is a lever 79 pivoted as at 80 to a suitable support. The opposite end of this lever is connected in a suitable manner to a switch member 81 controlling the circuit across the terminals 82—83 of motor supply lines 84—85, which lines are controlled by main switch 86.

The operation of the device is as follows: Assuming that the motor is inactive due to an open position of switch 81. Under these conditions pressure is built up in the expansion chamber 3 and the connection 53. When the pressure is sufficient the diaphragm 75 is compressed and forced downwardly to close the switch 81, resulting in energization of the motor, (when main switch 86 is closed). After a certain number of compression strokes the pressure is reduced in line 53, due to the suction effect, resulting in a rise of the element 75, and breaking of the motor circuit. A predetermined resiliency is of course given the element 75, and thus the operation of circuit making and breaking is determined according to the degree of compression given the element 75, during the idle period of the motor and compressor. The driving means between motor and compressor is indicated at 90. The refrigeration mechanism here shown is of the low pressure control type.

I claim as my invention:

1. A device of the class described comprising a pair of casings, inner and outer, one within the other, spaced apart, a conducting medium in the space between the casings, said outer casing having a double wall defining a vertical circumferentially continuous expansion chamber, means connected with the expansion chamber for producing refrigerating effects therein, packing material surrounding the outer casing, and said inner casing having a liquid outlet extension traversing the bottom of the outer casing and removably but sealingly engaged with said bottom, and means closing the top of the inner casing and formed to support a bottle in inverted position for delivery of its contents into said inner casing.

2. A device of the class described comprising a pair of casings, inner and outer, one within the other and spaced apart, a conducting medium in the space between the casings, said outer casing having a double wall defining a vertical circumferentially continuous expansion chamber, and having a packing gland structure in its bottom wall, means connected with said expansion chamber for producing refrigerating effects therein and regulating the same, said inner casing having a tubular extension passing through the bottom wall of the outer casing, and removably secured by the gland for detachment by movement in a vertical direction, a valve controlled water delivery pipe also secured by said gland to receive liquid delivered from the tube, and packing surrounding the outer casing in a manner to reduce conduction effects.

3. A device of the class described comprising a pair of casings, inner and outer, one within the other and spaced apart, a conducting medium filling the space between the casings, said outer casing having a double wall defining a vertical circumferentially continuous expansion chamber, means connected with said expansion chamber for producing refrigerating effects therein, packing surrounding the outer casing in a manner to reduce conduction effects, said inner casing having a liquid outlet extension, traversing the bottom of the outer casing.

4. A device of the class described comprising a pair of casings, inner and outer, a liquid conducting medium between the casings, said outer casing having a double wall defining an expansion chamber, means connected with the expansion chamber for producing refrigeration effects therein, said inner casing having a liquid outlet extension leading vertically from its bottom, and means closing the top of the inner casing and formed to support a bottle in inverted position for delivery of its contents, said liquid outlet extension having a guard at the interior of the inner casing arranged to prevent entry of sediment.

5. A device of the class described comprising a receptacle having a conducting liquid therein, and having double walls defining an expansion chamber, means connected with the expansion chamber for producing refrigerating effects therein, and a non-metallic water reservoir within said receptacle and substantially submerged in said liquid.

In witness whereof, I have hereunto set my hand this 11th day of January, 1929.

BENJAMIN MARKUS.